(12) United States Patent
Etter et al.

(10) Patent No.: US 7,321,559 B2
(45) Date of Patent: Jan. 22, 2008

(54) SYSTEM AND METHOD OF NOISE REDUCTION IN RECEIVING WIRELESS TRANSMISSION OF PACKETIZED AUDIO SIGNALS

(75) Inventors: Walter Etter, Ocean Township, NJ (US); Katherine G. August, Matawan, NJ (US); Theodore Sizer, II, Little Silver, NJ (US)

(73) Assignee: Lucent Technologies Inc, Murray Hill, NJ (US)

( * ) Notice: Subject to any disclaimer, the term of this patent is extended or adjusted under 35 U.S.C. 154(b) by 999 days.

(21) Appl. No.: 10/186,149

(22) Filed: Jun. 28, 2002

(65) Prior Publication Data

US 2004/0001599 A1  Jan. 1, 2004

(51) Int. Cl.
*G01R 31/08* (2006.01)
(52) U.S. Cl. .................................. 370/242; 714/746
(58) Field of Classification Search ............... None
See application file for complete search history.

(56) References Cited

U.S. PATENT DOCUMENTS

| | | | | |
|---|---|---|---|---|
| 5,414,796 | A | | 5/1995 | Jacobs et al. .............. 395/2.3 |
| 5,526,349 | A | | 6/1996 | Diaz et al. ................. 370/58.1 |
| 5,652,903 | A | * | 7/1997 | Weng et al. ................ 712/35 |
| 5,673,210 | A | | 9/1997 | Etter ........................ 364/577 |
| 5,732,390 | A | * | 3/1998 | Katayanagi et al. ....... 704/227 |
| 5,774,452 | A | * | 6/1998 | Wolosewicz ............... 370/212 |
| 5,911,128 | A | | 6/1999 | DeJaco ..................... 704/211 |
| 5,925,146 | A | * | 7/1999 | Murata et al. ............. 714/746 |
| 5,943,319 | A | | 8/1999 | Fraser ....................... 370/259 |
| 6,205,124 | B1 | * | 3/2001 | Hamdi ...................... 370/260 |
| 6,230,124 | B1 | * | 5/2001 | Maeda ...................... 704/227 |
| 6,771,723 | B1 | * | 8/2004 | Davis et al. ............... 375/350 |
| 7,069,208 | B2 | * | 6/2006 | Wang ........................ 704/211 |
| 2002/0025137 | A1 | * | 2/2002 | Suzuki ...................... 386/75 |
| 2003/0039236 | A1 | * | 2/2003 | Uga .......................... 370/345 |
| 2006/0107183 | A1 | * | 5/2006 | Ejima et al. ............... 714/758 |

OTHER PUBLICATIONS

Walter Etter, *Removal of Impulse Noise*, Contributions to Noise Suppression in Monophonic Speech Signals, Chapter 5 (pp. 71-111) (1993).
Riku Mettala, *Bluetooth Protocol Architecture*, Version 1(pp. 1-20) (Aug. 25, 1999).
Walter Etter, *Restoration of a Discrete-Time Signal Segment by Interpolation Based on the Left-Sided and Right-Sided Autoregressive Parameters*, IEEE Transactions on Signal Processing, vol. 44, No. 5 (pp. 1124-1135) (May 1996).
Walter Etter and George S. Moschytz, *Noise Reduction by Noise-Adaptive Spectral Magnitude Expansion*, J. Audio Eng. Soc., vol. 42, No. 5 (pp. 341-349) (May 1994).

\* cited by examiner

*Primary Examiner*—Phirin Sam

(57) ABSTRACT

A receiver for receiving wireless packetized audio signals having packet headers, and packet payloads including encoded audio signals is provided. The receiver includes an audio decoder for decoding the encoded audio signals into digital audio signals, an audio error detector for detecting impulsive noise in the digital audio signals caused by corrupted payload packets, and a digital signal restoration unit for removing the impulsive noise from the digital audio signals. Further, a method of noise reduction includes the steps of receiving radio frequency packetized audio signals having packet headers, and packet payloads including encoded audio signals and demodulating the RF signals. The method further includes decoding the encoded audio signals into digital audio signals and detecting impulsive noise in the digital audio signals caused by corrupted payload packets. The method further includes removing the impulsive noise by reconstructing the corrupted digital audio signal.

25 Claims, 4 Drawing Sheets

SYSTEM AND METHOD OF NOISE REDUCTION IN RECEIVING WIRELESS TRANSMISSION OF PACKETIZED AUDIO SIGNALS

BACKGROUND OF THE INVENTION

The present invention relates to a system and method of noise reduction. More particularly, it relates to a receiver for receiving packetized audio signals and providing an audio output with reduced noise and a method of reducing impulsive noise in packetized audio signals.

Audio signals such as voice, music or other audio signals can be transmitted over a wireless interface. The audio signals are typically transmitted in packets including a packet header and a packet payload. Each packet payload includes a separate portion of the audio signal. The packetized audio signals are decoded into frames of digital audio signals which are combined in the proper sequence at the receiving end to produce the audio output signal.

During the wireless transmission, transmission errors can occur which corrupt some of the payload packets. The corrupted payload packets, which include missing or incorrect signal information, are decoded to form corrupted frames which produce undesirable audible noise in the audio output signal generated at the receiving end. Due to the short duration of the frames, the noise produced by corrupted frames is often perceived as clicks or other types of short duration noise called impulsive noise.

Error protection has been traditionally applied to detect and correct transmission errors. Some conventional error protection schemes include an error correction process, known as channel coding, which adds redundancy bits to the packets before the transmission takes place. In the receiver, these additional bits are used for detecting transmission errors as well as reconstructing the original payload contents if the transmission errors are within certain limits.

Many wireless transmission standards have a fixed channel capacity because the gross bit rate of transmission is fixed. For applications using fixed bit rate standards, error correction typically involves a tradeoff between the amount of error protection and the payload throughput. Using more bits to increase the error protection reduces the bits available for the payload, thus decreasing the payload throughput of the wireless transmission. A reduction in payload throughput results in either the transmission of a lower quality audio signal or a reduction in the amount of audio information, such as for example, the number of voice channels, which is transmitted.

Conventional error protection schemes for fixed channel capacity transmission standards handle this tradeoff in a variety of ways. Some error protection schemes maximize the audio channels available by using error protection in the packet header, but not the payload. However, with these header-only schemes, if the header is not corrupted but the payload is, the corruption will not be detected and impulsive noise will be generated at the receiver.

Other conventional error protection schemes allow for adapting the amount of error correction to the channel conditions. When there is more interference on a channel, more bits are used for error correction. For example GSM channel coding for adaptive multi-rate speech codec, the more interference a channel has the more bits used for channel coding and the less used for audio coding. However, the channel conditions may change more quickly than these approaches can compensate for.

It is desirable to improve the quality of packetized audio information transmitted over a wireless interface. It is also desirable to reduce impact of transmission errors on transmitted audio and minimize the channel bandwidth used for channel coding.

SUMMARY OF THE INVENTION

According to the present invention, a new and improved system and method of noise reduction for use in receiving the wireless transmission of packetized audio signals is provided.

In accordance with a first aspect of the invention, a receiver for receiving wireless packetized audio signals having packet headers, and packet payloads including encoded audio signals is provided. The receiver includes an audio decoder for decoding the encoded audio signals into frames of digital audio signals, an audio error detector for detecting impulsive noise in the digital audio signals caused by corrupted payload packets not otherwise detected by conventional channel decoding, and a digital signal restoration unit for removing the impulsive noise from the digital audio signals. The digital signal restoration unit can remove the impulsive noise by reconstructing the digital audio signals in corrupted frames or muting them.

In accordance with a second aspect of the invention the audio error detector includes a linear prediction (LP) parameter estimator for estimating LP parameters of the digital audio signals, an LP inverse filter for filtering the digital audio signals using the LP parameters, and a threshold detector for providing a threshold used in detecting impulsive noise exceeding the threshold.

In accordance with another aspect of the invention, a method of noise reduction for use in receiving the wireless transmission of packetized audio signals is provided. The method includes receiving radio frequency (RF) packetized audio signals having packet headers, and packet payloads including encoded audio signals and demodulating the RF signals. The method may also include decoding channel-encoded signals into frames of digital audio signals using known error protection schemes to detect corrupted header and/or payload packets. The method further includes detecting impulsive noise in the digital audio signals caused by corrupted payload packets. The method further includes removing the impulsive noise by either reconstructing the digital audio signals in the corrupted frames or muting the affected audio signal(s).

BRIEF DESCRIPTION OF THE DRAWINGS

The invention may take form in certain components and structures, preferred embodiments of which will be illustrated in the accompanying drawings wherein.

DETAILED DESCRIPTION OF THE INVENTION

It is to be understood that the specific devices and processes illustrated in the attached drawings, and described in the following specification are simply exemplary embodiments of the inventive concepts defined in the appended claims. The term audio as used herein refers to any suitable known audio signals including, but not limited to, voice signals, music signals, or any other audio signals, unless otherwise indicated.

Figure 1:
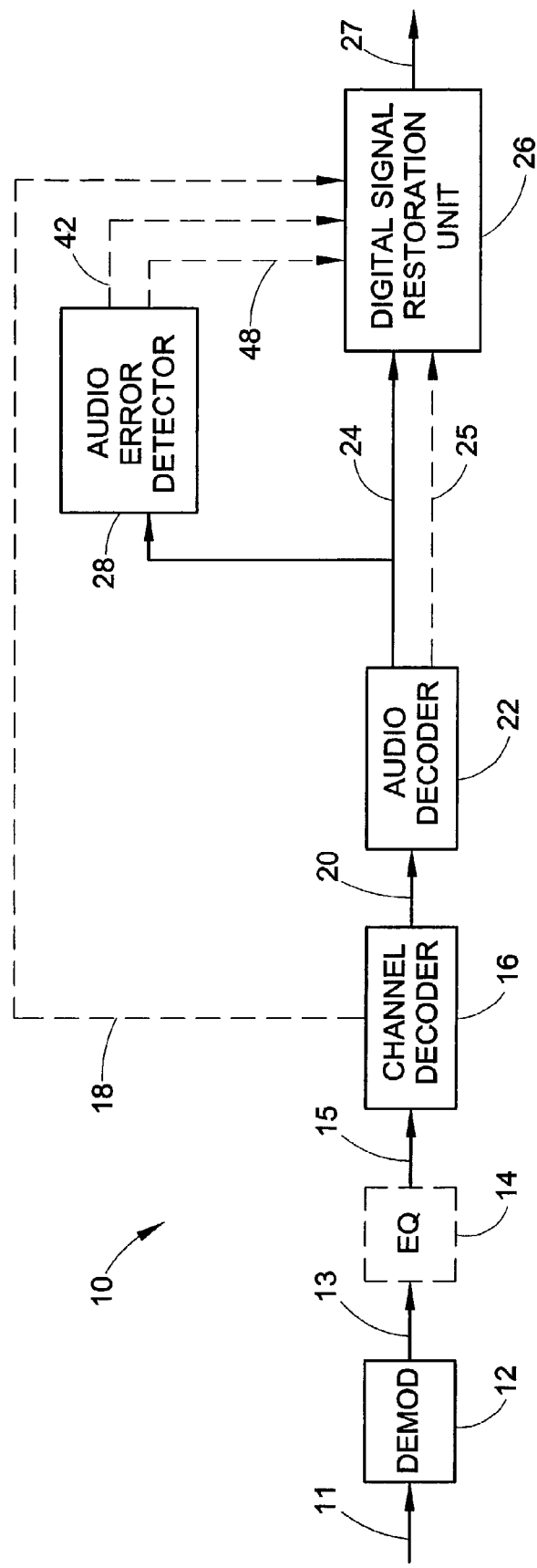
FIG. 1 is a block diagram of a receiver having the audio error detector for reducing noise in accordance with the invention.

Referring now to FIG. 1, a block diagram of a receiver for receiving wireless transmission of packetized audio signals and providing noise reduction in accordance with the invention is shown generally at 10. The receiver 10 includes a conventional demodulator 12 which receives an RF signal at 11 transmitted by a known transmitter (not shown)

The demodulator 12 demodulates the RF signal 11 to bring it into the base-band in any suitable known manner. The demodulator 12 also digitizes the demodulated signal in any suitable known manner by means of a conventional analog-to-digital converter (not shown) to provide a digital packetized encoded signal at 13.

The receiver 10 can also include an equalizer 14 for providing an equalized signal at 15. The equalizer 14 can be any suitable known equalizer for equalizing the demodulated signal 13 in a known manner to compensate for the impulse response of the radio channel which may result in fading and multi-path dispersion. For example, in the Global System for Mobile communications (GSM), a training sequence is used that is part of the transmitted signal 11. The equalizer 14 can be optional, as shown by the dashed lines, and for short-range applications such as Bluetooth, the equalizer 14 may not be necessary and thus not included in the receiver 10.

The receiver 10 can also include a channel decoder 16 for decoding channel-encoded signals to provide audio coded signals at 20. The channel decoder 16 receives the demodulated signal 13, or the demodulated and equalized signal 15, and uses known error protection schemes to detect corrupted header and/or payload packets. The channel decoder 16 can include known header and payload packet error protection schemes and/or header-only packet error protection schemes. Upon detecting a corrupted payload packet, the channel decoder 16 recovers the corrupted payload in a known manner. If the channel decoder detects an irrecoverably corrupted payload packet from which the payload cannot be recovered, the channel decoder 16 sets a channel decoder error detection flag at 18 for triggering the signal restoration unit 26, described below, to reconstruct the digital audio signal corresponding to the corrupted packet or mute the resulting digital audio signal as described below.

Before the wireless transmission of the RF signal 11 to the receiver 10 occurs, the audio signal is typically encoded by an audio coder (not shown) to compress the signal thereby reducing the bit rate of the wireless transmission. The receiver 10 includes an audio decoder 22 for decoding each of the compressed packetized signals 13, 15, or 20 to generate corresponding digital audio signals 24 in a known manner using any suitable known codec (coder-decoder).

In one example, which should not be considered limiting, the audio decoder 22 uses a known 8-bit logarithmic Pulse Code Modulation (PCM) voice codec. This codec can be A-law or µ-law as defined in ITU-T recommendations G.711. Other examples for audio decoder 22 codecs include, but are not limited to, the Adaptive Multirate (AMR) voice codecs used in GSM, or the Continuous Slope Delta Modulation (CVSD) voice codec commonly used in Bluetooth. Any other suitable known audio codecs besides voice codecs can also be used by the audio decoder 22 including, but not limited to, MPEG audio codecs commonly used in consumer electronics.

An example of a digital audio signal 24 output from the audio decoder 22 is a linear 13-bit audio signal with a sampling rate of 8 kHz, although any other suitable known digital audio signal may be produced. A frame may include any suitable amount of digital audio signal spanning any suitable length of time. The digital audio signal frames are later combined in a sequential manner to provide an audio output.

The receiver 10 also includes a digital signal restoration unit 26 which receives the digital audio signal 24 from the audio decoder 22 and removes impulsive noise by reconstructing the corrupted digital audio signals using known methods to reduce the noise in the audio output signal provided at 27. The digital signal restoration unit 26 may not provide a perfect, or bit-exact, reconstruction, however, it generally provides a good approximation of the original digital audio signal that is often not discernable from the original by the listener. The digital signal restoration unit 26 also reconstructs the digital audio signals, or mutes them, corresponding to the irrecoverably corrupted packets detected by the channel decoder 16 when triggered by the channel decoder error detection flag 18.

Known methods for digital signal restoration include, but are not limited to, forward prediction and forward-backward prediction techniques. Examples of known forward prediction and forward-backward prediction techniques are taught by Etter, in U.S. Pat. No. 5,673,210 filed Sep. 29, 1995 which is hereby incorporated herein by reference, although any other suitable known forward prediction or forward-backward prediction techniques may be used. Forward-backward prediction schemes typically involve a delay introduced to the signal to utilize digital signal frames which follow the corrupted frame corresponding to the corrupted payload. The delay (not shown) can be provided in any suitable known manner and shall not be described in further detail.

The receiver 10 also includes an audio error detector 28. The audio error detector 28 combines the frames of digital audio signals into segments and performs impulsive noise detection for detecting impulsive noise in the segments caused by corrupted audio signal payload packets as described above. Upon detecting impulsive noise, the audio error detector 28 triggers the digital signal restoration unit 26 which removes the impulsive noise by reconstructing the digital audio signal thereby reducing the noise in the audio output signal 27. The error detection capability of the audio error detector 28 may vary depending on the codec used.

Figure 2:
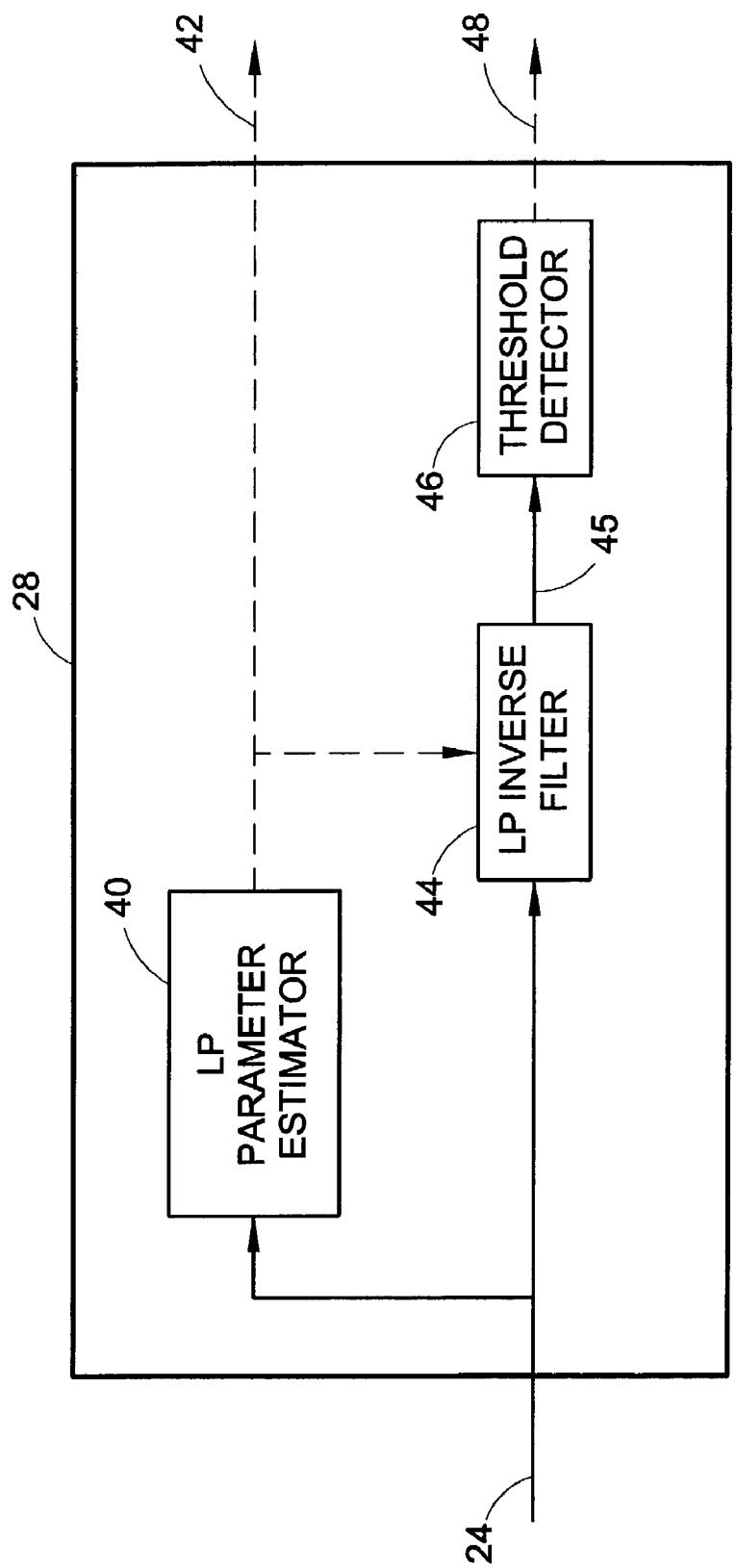
FIG. 2 is a block diagram of an audio error detector in shown in FIG. 1.

Referring now to FIG. 2, a detailed block diagram of an audio error detector 28 in accordance with the invention is shown. In the preferred embodiment of the invention, the audio error detector 28 uses LP (linear predictor) inverse filtering for the impulsive noise detector. Alternatively, the audio error detector 28 can use any suitable known impulsive noise detection scheme.

The audio error detector 28 includes a linear prediction (LP) parameter estimator 40 which estimates the LP parameter coefficients of the audio signal 24 received from the audio decoder 22. The audio error detector 28 also includes an LP inverse filter 44 which uses the LP parameters to determine an inverse filter for filtering the digital audio signal 24. The audio error detector 28 also includes a threshold detector 46 for providing a threshold and setting an error detection flag 48 to signal the digital signal restoration unit 26 that the digital audio signal has been corrupted for signal portions which exceed the threshold.

The threshold detector 46 can be implemented using a method of threshold determination and impulsive noise detection. Impulsive noise can be defined as any noise of short duration, such as less than a few tens of milliseconds, which forms a burst or click of arbitrary magnitude in the signal and is substantially uncorrelated with the audio signal. Impulse noise detectors optimized for detecting impulsive noise of shorter duration such as a few milliseconds may be preferable for wireless transmission standards having short packet lengths such as, for example, Bluetooth HV3, which uses packet lengths of only 3.75 msec.

The audio error detector 28 models the audio signal 24 as an LP model, also known as an autoregressive (AR) model. In such a model, it is assumed that a sample of the audio signal 24 can be predicted based on a number of previous samples of the audio signal. For example, consider an audio signal s(i) with time-index i that may be predicted based on the previous K samples, that is, $$s(i) = \sum_{j=1}^{K} a_j s(i-j) + v(i)$$

where $a_j$ are the LP parameters of the signal and v(i) is the excitation.

Using the inverse filter 44, the inverse-filtered signal 45 can be written as:

$$v(i) = s(i) - \sum_{j=1}^{K} a_j s(i-j)$$

where v(i) is also referred to as the prediction error.

If the signal s(i) at 24 becomes corrupted with a pulse p(i), the corrupted audio signal 24 can be denoted as y(i)=s(i)+p(i), and the corresponding inverse filtered signal 45, also referred to as the estimation error μ(i) becomes:

$$\mu(i) = y(i) - \sum_{j=1}^{K} \hat{a}_j y(i-j)$$

where $\hat{a}_j$ is an estimate for the true LP parameters $a_j$. The estimation error μ(i) can be used to detect impulsive noise in the audio signal 24. Typically, the estimation error becomes large for impulsive corruption, since little correlation exists between the audio signal and the corruption itself. With respect to the previous equations, this means μ(i) is much greater than v(i).

The LP inverse filter can be expressed with the z-transform as $$\hat{A}(z) = 1 - \sum_{i=1}^{K} \hat{a}_i z^{-i}$$

The LP parameter estimator 40 can use any known method to estimate the LP parameters $\hat{a}_i$ from the input signal such as, for example, known autocorrelation methods described by L. R. Rabiner, et al in "Digital Processing of Speech Signals", Prentice Hall, 1978. The threshold detector 46 compares the inverse filtered signal 45 with a threshold. Any suitable signal parameter which varies when the signal includes impulsive noise, such as for example the signal level, can be used as the threshold. The impulse noise detector 28 can detect corrupted audio signal packets even if the corrupted signal portions are smaller in amplitude than the audio signal itself.

If μ(i) is greater than the threshold, this indicates that a payload packet has been corrupted. The error detector 28 then triggers the signal reconstruction in the digital signal restoration unit 26 by setting an error detection flag 48. The digital signal restoration unit 26 reconstructs the digital audio signal in the corrupted frame in any suitable known manner, as described above.

In accordance with the invention, the audio error detector 28 does not depend on the packet header to detect corrupted payloads. As an example, consider an 8-bit logarithmic PCM codec (A-law or μ-law as defined in ITU-T recommendations G. 711) that is transmitted as Bluetooth HV3 packets (HV stands for high quality voice), using error protection for the header, but no error protection for the payload. Assume bits of the packet payload get corrupted, but none of the header bits. In this case, the channel decoder 16 does not detect the corrupted payload packet(s), and the corrupted payload packet(s) will be used to generate an audio output signal 27 having undesirable noise.

However, the corrupted frame of digital audio signal 24 can be detected by the audio error detector 28. The error detection flag 48 is set and the digital signal restoration unit 26 reconstructs the corrupted and/or missing digital signal(s) based on signal parameters generated by the audio error detector 28, the digital signal restoration unit 26, or the audio decoder 22 as described below. In this manner, the invention enables a receiver 10 to provide sufficient noise reduction using fewer bits for channel coding thereby providing improved payload throughput for fixed bit rate standards.

The audio error detector 28 can be used in a receiver 10 having a channel decoder 16 capable of using both header-only and header and payload packet error detection schemes to provide robust error detection. This arrangement can provide added flexibility in handling transmitted signals with error protected payloads and headers, in which case error detection can be performed by the channel decoder 16 in a known manner. The audio error detector 28 can still operate to detect any corrupted packets not detected by the channel decoder 16. Alternatively, the invention may be used for improving noise reduction in receivers 10 not having a channel decoder 16 for error detection thereby maximizing the payload throughput.

In an alternate embodiment of the receiver 10, the digital signal restoration unit 26 utilizes parameters 25 calculated in the audio decoder 22 derived from adjacent error free frames to reconstruct the corrupted frame(s) of digital audio signals in a known manner. The parameters 25 can be LP parameters generated in any known manner including but not limited to those described above, known autocorrelation parameters, pitch parameters, or any other suitable known signal parameters used for reconstructing corrupted frames of digital audio signals. Examples of such a digital signal restoration unit 26 can use known codecs including, but not limited to, GSM codecs.

In a second alternate embodiment, the digital signal restoration unit 26 generates the signal parameters and does not receive these parameters from external sources, such as the audio decoder 22 via connection 25, or the audio error detector 28 via connection 45. The digital signal restoration unit 26 uses these signal parameters in a manner as described above to reconstruct the corrupted payload packets, thereby improving the quality of the audio output signal 27.

In a third alternate embodiment, the receiver 10 may include a known digital signal restoration unit 26 which does not use the prediction parameters needed to reconstruct corrupted frames of digital audio signals. Therefore, rather than reconstruct the digital audio signals, the digital signal restoration unit 26 removes the impulse noise by muting the corrupted digital audio signal frame(s) detected by the channel decoder 16 and/or the audio error detector 28.

Figure 3:
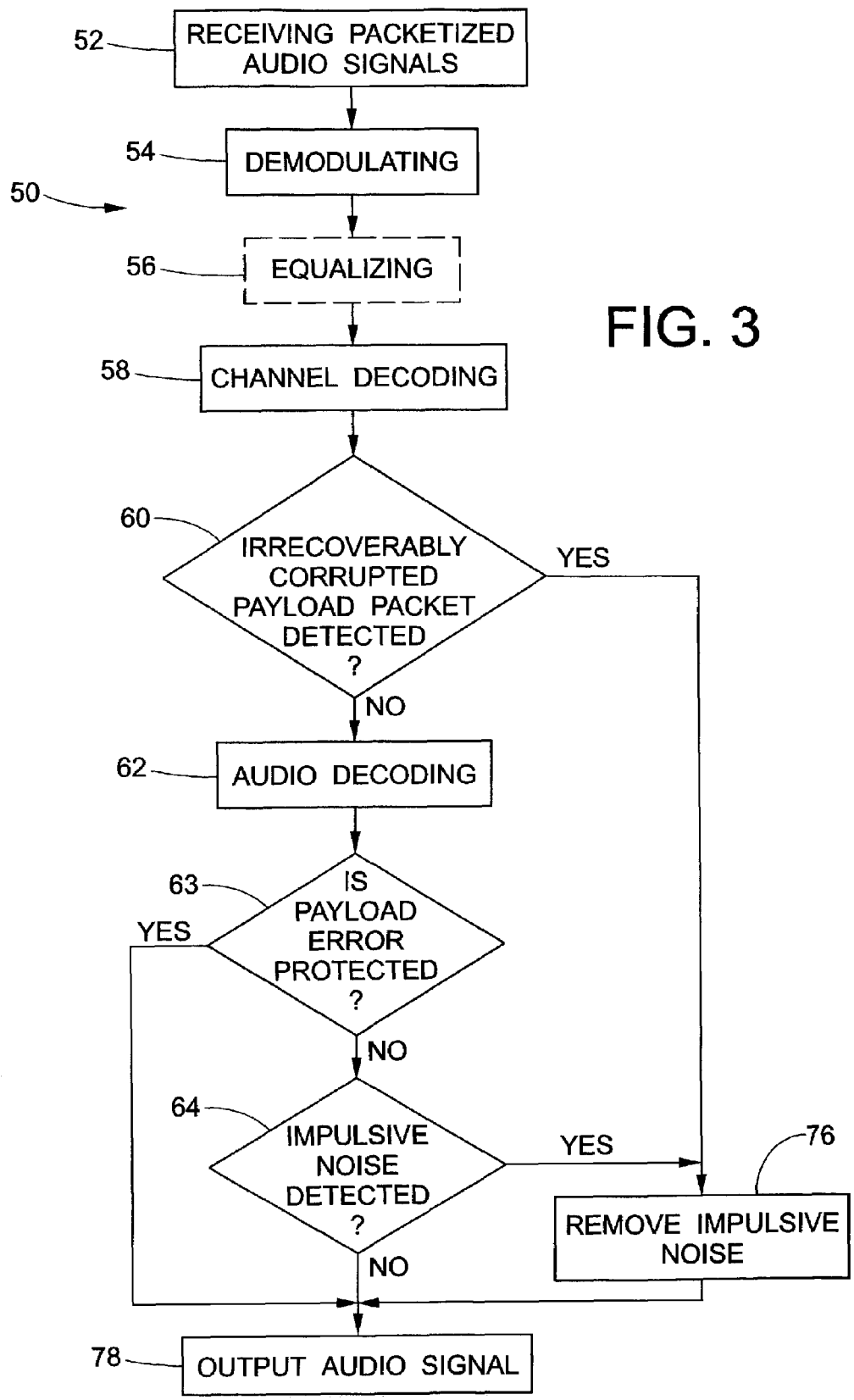
FIG. 3 illustrates a method of noise reduction in accordance with the invention.

Referring now to FIG. 3, a method of noise reduction for use in wireless transmission of packetized audio signals is shown at 50. The method 50 includes the steps of receiving RF packetized audio signals at 52. The packets having packet headers and payloads which include encoded audio signals. The method also includes the step of demodulating the RF signals at 54 in any known manner. The method may also include the step of equalizing the demodulated signals at 56 to compensate for the impulse response of the air interface in a known manner. The equalizing step 56 is optional as indicated by the dashed lines.

The method 10 also includes the step of channel decoding the demodulated signals at 58. In the channel decoding step 58, the channel decoder 16 described above decodes a channel-encoded signal using any suitable known error protection scheme determined by the channel encoder to detect a corrupted payload packet as described above. If a corrupted payload packet is detected, the channel decoder 16 recovers the corrupted payload packet in any suitable known manner to provide a payload packet suitable for audio decoding as described below. However, if an irrecoverably corrupted payload packet is detected by the channel decoder at step 60, the channel decoder error detection flag 18 is set and the corrupted packet is sent to the digital signal restoration unit 26. The digital signal restoration unit 26 removes the impulsive noise at step 76 resulting from the corrupted payload packet by either restoring the audio signal or muting it as described above.

The method further includes decoding the encoded audio signal into a frame of digital audio signal at step 62 if an irrecoverably corrupted payload packet is not detected at step 60. If the payload was not error protected the packet is sent to the audio error detector 28 as shown at step 63. As such, the method further includes detecting impulsive noise in the digital audio signal caused by at least one corrupted payload packet at step 64.

Figure 4:
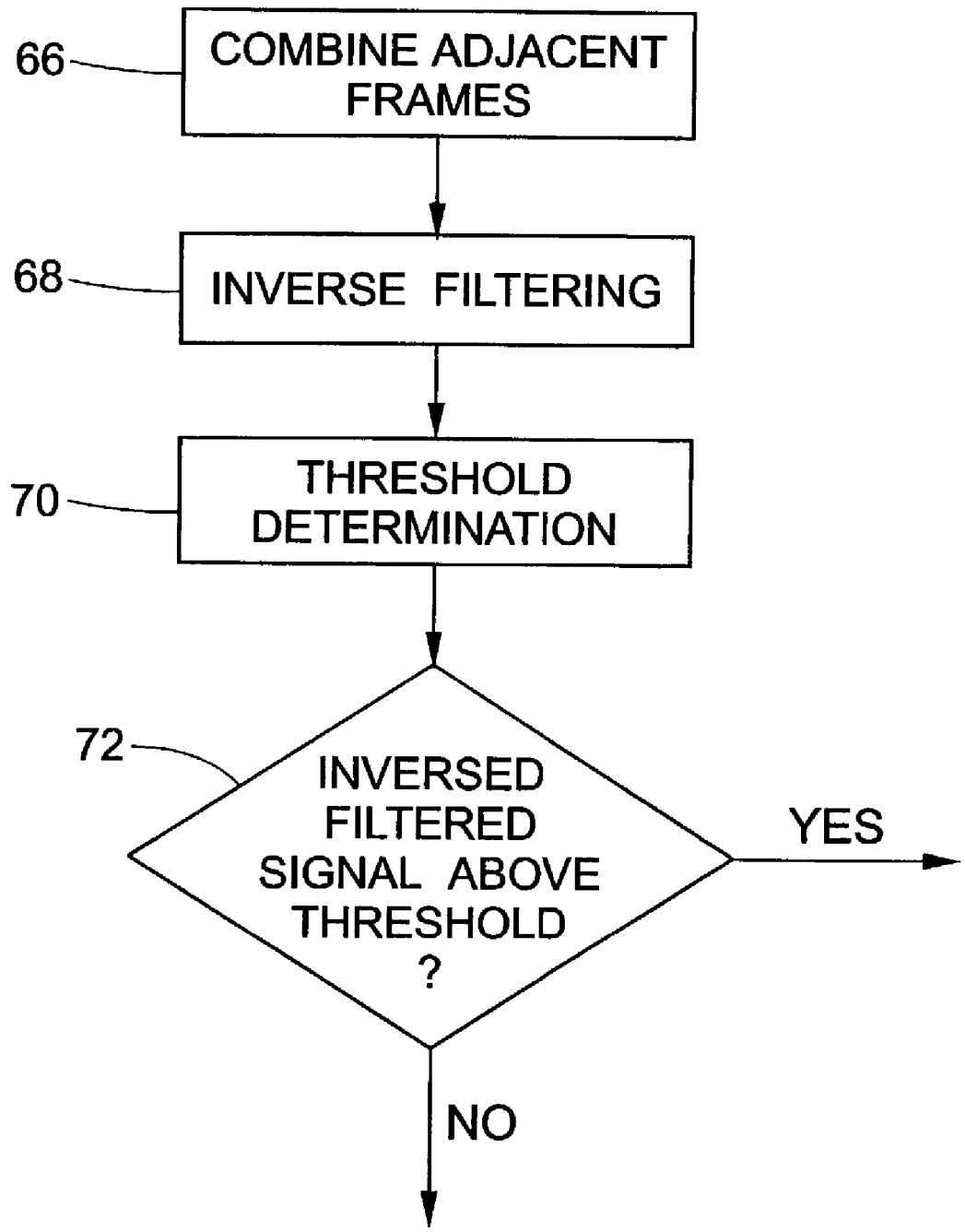
FIG. 4 illustrates a method audio error detection shown in FIG. 3 in accordance with the invention.

The detecting step 64 includes using an audio error detector 28 in the manner described above. Referring to FIG. 4, the step of detecting impulsive noise 64 can further include combining adjacent frames of digital audio signals into segments at 66. The frames may be stored in a known buffer arrangement and may only include those frames preceding the frame being processed, or preceding and subsequent frames using known delay means. The segments are processed to detect impulsive noise in a manner as described above, which includes LP inverse filtering the digital audio signals using the LP parameter coefficients at 68, and providing a threshold for the detection of impulsive noise at 70, and detecting impulse noise exceeding the threshold at 72 in a similar manner as described above.

If an irrecoverably corrupted payload packet is detected in step 60 or impulse noise from at least one corrupted frame caused by at least one corrupted payload packet which corresponds to the corrupted frame is detected at step 64, the impulsive noise is removed at step 76. The impulsive noise is removed by either reconstructing the digital audio signal of the corrupted frame or alternatively, muting the affected audio signal(s) as described above. Upon the removal of the impulse noise 66, the audio signal is output at step 78 to provide an audio signal having improved noise reduction.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

We claim:

1. A receiver for receiving wireless packetized audio signals having packet headers, and packet payloads including encoded audio signals, the receiver comprising:
    an audio decoder decoding the encoded audio signals into decoded digital audio signals;
    an audio error detector detecting impulsive noise in said decoded digital audio signals caused by corrupted payload packets; and
    a digital signal restoration unit removing said impulsive noise and reconstructing a digital audio signal corresponding to said corrupted payload packet.

2. The receiver defined in claim 1 wherein the audio error detector comprises:
    a linear prediction (LP) parameter estimator fef estimating LP parameters of said decoded digital audio signals;
    an LP inverse filter for filtering said decoded digital audio signals using the LP parameters; and
    a threshold detector fef providing a threshold used in detecting impulsive noise exceeding the threshold.

3. The receiver defined in claim 1 wherein said digital signal restoration unit reconstructs said digital audio signal using linear predictor parameters generated by the audio error detector.

4. The receiver defined in claim 1 wherein said digital signal restoration unit generates signal parameters used for reconstructing the digital audio signal.

5. The receiver defined in claim 4 wherein said signal parameters are linear predictor coefficients.

6. The receiver defined in claim 4 wherein said signal parameters are pitch parameters.

7. The receiver defined in claim 1 wherein said audio decoder uses a codec generating linear predictor parameters for decoding said encoded audio signals and said digital signal restoration unit reconstructs said corrupted digital audio signal using said linear predictor parameter coefficients generated by the audio decoder.

8. The receiver defined in claim 1 wherein the wireless packetized audio signal packet headers are channel encoded for noise reduction and further including a channel decoder decoding the packet headers and signaling the digital signal restoration unit to reconstruct corrupted digital audio signals.

9. A receiver for receiving wireless packetized audio signals having packet headers, and packet payloads including encoded audio signals, the receiver comprising:
    an audio decoder decoding encoded audio signals into decoded digital audio signals;
    an audio error detector detecting impulsive noise in said decoded digital audio signals caused by corrupted payload packets; and
    a digital signal restoration unit removing said impulsive noise from said decoded digital audio signals by muting said digital audio signals corresponding to said corrupted payload packets.

10. A method of noise reduction in wireless transmission of packetized audio signals comprising:
  receiving wireless packetized audio signals having packet headers, and packet payloads including encoded audio signals;
  decoding encoded audio signals into frames of digital audio signals;
  combining the frames into segments of digital audio signals;
  detecting impulsive noise in a segment from at least one corrupted frame caused by at least one corrupted payload packet corresponding to the corrupted frame;
  removing the impulsive noise from the segment by reconstructing the digital audio signal in the at least one corrupted frame; and
  providing audio output.

11. The method of noise reduction defined in claim 10 wherein the reconstructing step includes at least one of forward prediction and forward-backward prediction.

12. The method of noise reduction defined in claim 11 wherein the reconstructing step comprises switching between forward and forward-backward prediction.

13. The method of noise reduction defined in claim 10 wherein the step of removing the impulsive noise includes muting the impulse noise.

14. The method of noise reduction defined in claim 10 wherein the step of detecting impulsive noise comprises:
  estimating LP parameter coefficients of the digital audio signals;
  LP inverse filtering the digital audio signals using the LP parameter coefficients; and
  providing a threshold for the detection of impulsive noise exceeding the threshold.

15. The method of noise reduction defined in claim 10 wherein the step of detecting impulsive noise comprises modeling the digital audio signals using a Linear Predictor (LP) model wherein the digital audio signals, written as s(i) with time-index i, may be predicted based on the previous K samples, such that $$s(i) = \sum_{j=1}^{K} a_j s(i-j) + v(i)$$

where $a_j$ are the LP parameters of the signals and v(i) is the excitation, and the step of detecting impulsive noise further comprises:
  estimating the true LP parameters $a_j$ to generate estimated LP parameters âj, and
  inverse filtering the audio signal s(i), wherein the audio signal corrupted with a pulse p(i) is denoted as y(i)=s(i)+p(i), to generate an estimation error μ(i), wherein $$\mu(i) = y(i) - \sum_{j=1}^{K} \hat{a}_j y(i-j).$$

16. The method of noise reduction defined in claim 15 wherein the estimating step comprises using autocorrelation methods to generate the estimated LP parameters â.

17. The method of noise reduction defined in claim 16 further comprising:
  comparing the estimation error μ(i) to a threshold; and
  signaling the detection of impulsive noise when the estimation error μ(i) exceeds the threshold.

18. The receiver defined in claim 1 wherein the audio error detector further comprises:
  the audio error detector modeling the digital audio signals using a Linear Predictor (LP) model wherein the digital audio signals, written as s(i) with time-index i, may be predicted based on the previous K samples, such that $$s(i) = \sum_{j=1}^{K} a_j s(i-j) + v(i)$$

where $a_j$ are the LP parameters of the signals and v(i) is the excitation;
  the audio error detector estimating the true LP parameters $a_j$ to generate estimated LP parameters $\hat{a}_j$; and
  the audio error detector inverse filtering the audio signal s(i), wherein the audio signal corrupted with a pulse p(i) is denoted as y(i)=s(i)+p(i), to generate an estimation error μ(i), wherein $$\mu(i) = y(i) - \sum_{j=1}^{K} \hat{a}_j y(i-j).$$

19. The receiver defined in claim 18 wherein the audio error detector uses autocorrelation methods to generate the estimated LP parameters $\hat{a}_j$.

20. The receiver defined in claim 1 wherein said audio decoder calculates parameters derived from adjacent error free frames and said digital signal restoration unit reconstructs said corrupted digital audio signal using said parameters.

21. The receiver defined in claim 1 wherein said parameters are linear predictor parameters.

22. The receiver defined in claim 1 wherein said parameters are autocorrelation parameters.

23. The receiver defined in claim 1 wherein said parameters are pitch parameters.

24. The receiver defined in claim 1 wherein said digital restoration unit uses GSM codec.

25. The receiver defined in claim 1 wherein said audio error detector detects said impulsive noise by detecting corrupted audio signal packets with corrupted signal portions having amplitudes smaller than the amplitude of said decoded digital audio signal.

* * * * *